Sept. 25, 1962

C. STONE 3,055,488

CONVEYOR BELT FLIGHT CLIP

Filed Nov. 4, 1959

INVENTOR
*Chester Stone*

BY *Burns, Doane, Benedict & Irons*
ATTORNEYS

United States Patent Office 3,055,488
Patented Sept. 25, 1962

3,055,488
CONVEYOR BELT FLIGHT CLIP
Chester Stone, Kernstown, Va., assignor to Ashworth Bros., Inc., Fall River, Mass., a corporation of Massachusetts
Filed Nov. 4, 1959, Ser. No. 850,889
5 Claims. (Cl. 198—198)

This invention relates to conveyor belts and to flight clips for conveyor belts.

Conveyor belts composed of a flexible mesh fabric of metal or similar material are presently in wide commercial usage. It is common practice to distribute a plurality of upstanding flights across the upper surface of such belts to assist in holding the conveyed material against movement along the belt surface particularly when the belt is negotiating an inclined path. Some disadvantages of certain heretofore known flights are difficulty of mounting and removal and complexity of the connections required firmly to retain the flights in upright position particularly when transporting heavy material.

The connection of the flights to the belt presents a particularly difficult problem where the belt must follow a path which is curved transversely in the plane of travel of the belt, as disclosed for example in Bechtel Patent 2,872,023. In such belts, the mesh structure is collapsible in the plane of the belt to permit flexure of the belt into the configuration of the curved path. Many prior art belt flight connections would seriously interfere with the necessary collapsing of the belt mesh.

To overcome the disadvantages of heretofore known devices, it is an object of this invention to provide an improved flight clip for a mesh fabric conveyor belt which is economical, highly effective, easily mountable and removable and firmly held in upright position when mounted.

It is another object of this invention to provide such a flight clip which is easily fabricated in one piece.

A further object of this invention is to provide such a flight clip which is characterized by minimum interference with the collapse of the belt mesh which occurs when the belt follows a path which is curved in the plane of the belt.

Broadly, the invention includes a conveyor belt and a plurality of flight clips. The conveyor belt comprises a flexible fabric having a plurality of spaced apart members with at least some opposed pairs of the members having opposed pairs of first connecting elements positioned along the sides of the members at a predetermined distance from the tops thereof to permit connection thereto of the flight clips. Each flight clip comprises a pair of upstanding legs having at their lower ends a pair of opposed second connecting elements corresponding to the first connecting elements and engageable therewith by horizontal movement relative thereto. Means are provided to connect the legs together at spaced apart positions normally to retain the first and second connecting elements engaged. The flight clips are resiliently yieldable to permit relative lateral movement of the legs to facilitate engagement and disengagement of the first and second connecting elements. Further, a flange is provided which extends laterally from at least one of the legs at a distance above the second connecting elements slightly greater than the distance between the first connecting elements and the tops of the said members so that said flange closely overlies its associated member to restrict rotation of the clip about the connecting elements. Thus the clips are easily mountable and removable and are firmly retained in upright positions when mounted.

The invention having been generally described, a specific embodiment thereof will now be set forth in detail with reference to the accompanying drawings in which.

Figure 1:
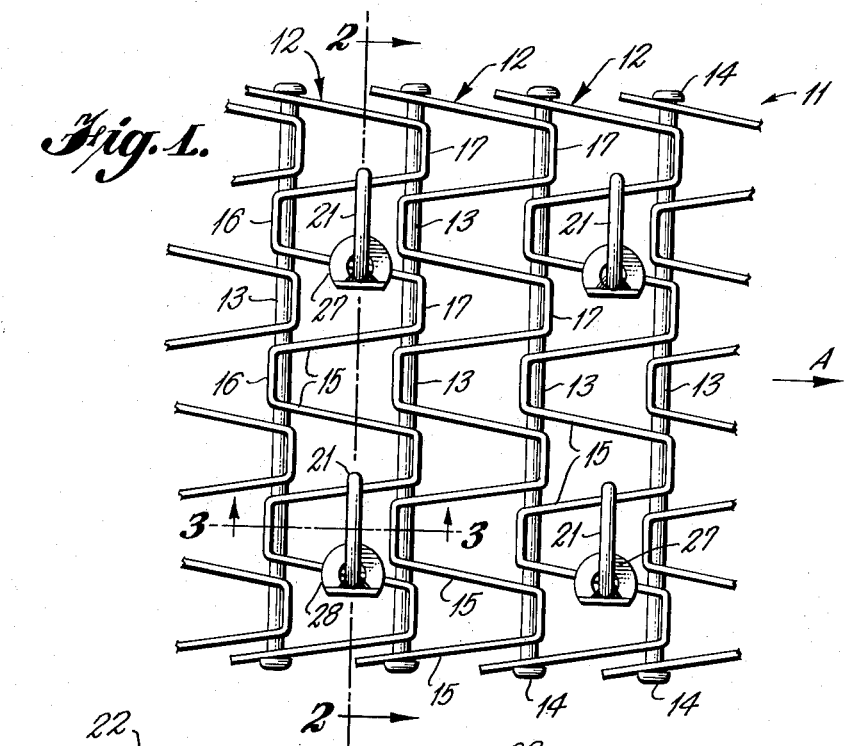
FIGURE 1 is a plan view of a portion of a conveyor belt according to the invention.
Figure 2:
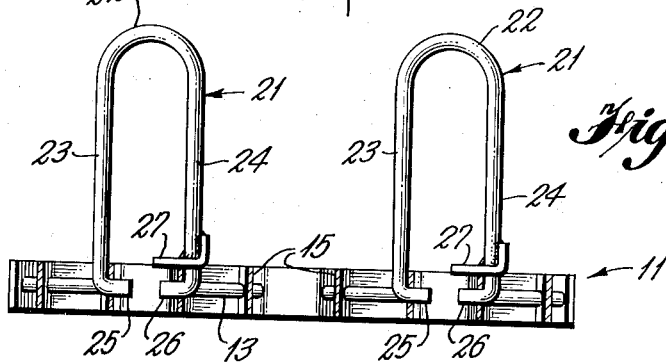
FIGURE 2 is a fragmentary horizontal sectional view taken in the direction of the arrows along the line 2—2 of FIGURE 1 and showing an elevation of the flight clips.

As depicted in FIGURE 1, the invention includes a conveyor belt 11 formed of a flexible mesh fabric preferably of metal but alternatively of any suitable material. The belt 11 comprises a plurality of tractive links 12 pivoted together by tractive cross pins 13 which are held against transverse displacement by enlarged heads 14.

Each link 12 is fabricated of a single piece of flat wire which is formed in a series of loops or bends to provide a plurality of elongated, spaced apart wire members 15 which extend in the general direction of the movement of the belt. The members 15 are alternately inclined leftwise and rightwise from the longitudinal axis of the belt and are connected at alternate ends by end portions 16 and 17, respectively. Thus, as best seen in FIGURE 1 each pair of adjacent members 15 form a wedge-shaped structure with the members connected across the narrow end of the wedge. The wedge-shaped structures of adjacent links are staggered so that upon longitudinal collapse of the belt as described hereinafter, adjacent links are nested within each other. The outermost wire members on the lateral sides of the belt are free at their rear ends, it being assumed that the belt travels in the direction indicated by the arrow A in FIGURE 1. The belt is actually reversible, however, and may travel in a direction opposite to the arrow A.

Each of the wire members 15 is provided with a substantially elongated slot 18 in its forward part adjacent the associated end portion 17. Each member 12 is also provided in its rear part with a round hole 19 adjacent the end portion 16 on the inside members. Each cross pin 13 extends through the holes 19 at the rear of one link 12 and through the slots 18 in the front of the next succeeding link. With this construction, the pins 13 engage the end portions 16 and 17 of adjacent links during normal straight line travel and the pull of the belt is distributed throughout its width. The pins 13 serve as pivots about which the links may be bent relative to one another to permit the belt to travel around directing pulleys.

By virtue of the elongated slots 18, the belt 11 is adapted to follow a path which is substantially curved transversely in the plane of travel of the belt. The belt may travel not only in a circular path but in elliptical, sinuous, and many other bent paths. When the belt rounds a curve in the plane of the belt, the tractive load is carried by the radially outer, convex edge portion of the belt and the radially inner, concave portion is free to contract or collapse as the cross pins 13 slide rearwardly in the slots 18. In this manner, the belt adjusts itself freely to follow the curved path.

A plurality of flight clips 21 are mounted as shown in FIGURE 1 at distributed locations on at least some of the links 12 approximately in the middle of the wire members 15. These flight clips serve to increase the traction between the belt and the material being conveyed to prevent such material from slipping longitudinally, particularly when the belt is ascending or descending an incline.

Figure 3:
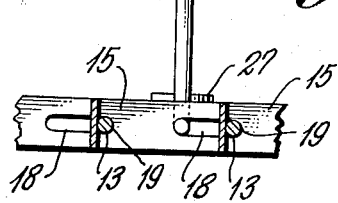
FIGURE 3 is a fragmentary vertical sectional view taken in the direction of the arrows along the line 3—3 of FIGURE 1.
Figure 4:
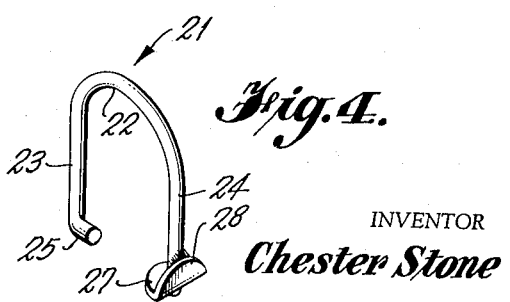
FIGURE 4 is a perspective view of a flight clip according to the invention.

Each of the flight clips 21 is formed of resilient wire in a generally U-shaped configuration with an upper base portion 22 and a pair of legs 23 and 24 depending downwardly from the base 22. The lower ends of the legs are bent inwardly to form a pair of opposed protrusions 25 and 26. The clip 22 is mounted on one of the links 12 by inserting the protrusions 25 and 26 into the slots 18 of an adjacent pair of opposed wire members 15. As best seen in FIGURE 3, the flight normally is mounted with the protrusions 25 and 26 at the rear portion of the slot 18 near the midpoint of the wire members 15. It will be understood, however, that a pair of opposed openings separate from the slots 18 may be provided in the opposed members 15 on which the flight is mounted to receive the protrusions 25 and 26. Thus the rear portions of the slots 18 or alternatively, separate holes provide one pair of opposed connecting elements and the protrusions 25 and 26 provide another pair of opposed connecting elements to permit attachment of the clip 22 to the opposed pair of members 15.

The slots 18 or their counterpart separate openings are positioned in the members 15 a predetermined distance below the tops of such members. A flange 27 is welded or otherwise attached to the leg 24 a distance above the protrusion 26 slightly greater than said predetermined distance. The lower surface of the flange 27 is flat and corresponds to the upper surface of the member 15 so that when the protrusions 27 are inserted in one of the slots 18, the flange 27 closely overlies the top of the member 15. With this construction, the upper portion of the member 15 between the slot 18 and the top of the member is received in a close sliding fit between the protrusion 26 and the flange 27 to prevent or restrict rotation of the clip 21 about the protrusions 26. Thus, the flange 27 restrains the clip 21 against any tendency to tip. The flange 27 is provided by welding a conventional metal washer 28 to the leg 24 with the side of the washer opposite the flange 27 turned upwardly and laid flat against the leg 24. It will be understood that a flange 27 may also be provided on the leg 23 to increase the resistance to tipping. However, tipping usually may be effectively prevented by providing a flange on one leg only. The resilience of the U-shaped clip structure normally retains the protrusions 25 and 26 in engagement with the slots 18. However, the U-shaped structure is resiliently yieldable to permit relative lateral movement of the legs 23 and 24, thus facilitating the engagement and disengagement of the protrusions and the slots.

When the belt is following a curved path and one side of the belt collapses by the relative nesting movement of the links toward one another, the flange 27 permits the members 15 and the end portions 16 to slide freely beneath the flange. Thus, the flanges present no interference with the collapsing of the legs. Such construction is an important advantage because otherwise the degree of curvature which the belt would be permitted to follow in its normal path of movement would be materially diminished.

There has been illustrated and described what is considered to be a preferred embodiment of the invention. It will be understood, however, that various modifications may be made by persons skilled in the art without departing from the scope of the invention as defined by the appended claims.

I claim:
1. A conveyor belt which comprises a flexible fabric having a plurality of elongated spaced apart members, at least some opposed pairs of said members having opposed pairs of first connecting means positioned along the sides of said members at a predetermined distance below the tops thereof; and a plurality of flight clips each comprising a pair of upstanding legs having at their lower ends a pair of opposed second connecting means corresponding to said first connecting means and engageable therewith by horizontal movement relative thereto, one of said first and second connecting means comprising protrusions and the other of said first and second connecting means defining openings to receive said protrusions, means connecting said legs at spaced apart positions normally to retain said first and second connecting means engaged, said flight clips being resiliently yieldable to permit relative lateral movement of said legs to facilitate engagement and disengagement of said first and second connecting means and a flange extending a substantial distance outwardly from at least one of said legs along the top of its associated member at a distance above said second connecting means slightly greater than said predetermined distance so as closely to overlie a relatively long portion of the associated member to effectively restrict rotation of the clip about said connecting means; whereby said clips are easily mountable and removable and are firmly retained in upright position when mounted.

2. A conveyor belt which comprises a flexible fabric having a plurality of elongated spaced apart members, at least some opposed pairs of said members having opposed pairs of first connecting means positioned along the sides of said members at a predetermined distance below the tops thereof; and a plurality of upstanding generally U-shaped resilient wire flight clips each having an upper base, a pair of free ended legs depending downwardly from said base, said legs having mounted at the lower ends thereof a pair of opposed second connecting means, one of said first and second connecting means comprising generally horizontal protrusions and the other defining openings to receive said protrusions by horizontal relative movement between said protrusions and openings, said resilient flight clips normally retaining said protrusions and openings engaged but being resiliently yieldable to permit relative lateral movement of said legs to facilitate engagement and disengagement of said protrusions and openings, and a flange extending a substantial distance outwardly from at least one of said legs along the top of its associated member at a distance above said second connecting means slightly greater than said predetermined distance so as closely to overlie a relatively long portion of the associated wire member to effectively restrict rotation of the clip about said connecting means; whereby said clips are easily mountable and removable and are firmly retained in upright positions when mounted.

3. An apparatus as recited in claim 2 wherein said protrusions are mounted on said legs and said openings are in said opposed pairs of members.

4. A flat wire conveyor belt operable in a path substantially transversely curved in the plane of the belt which comprises a plurality of continuous transverse tractive links; a plurality of pivotal tractive cross pins; each link being formed to provide a plurality of adjacent tractive wire members extending in the general direction of normal straight belt travel and having cross pin openings in each end of each of said members, all of said members in at least some of said links having the cross pin openings in at least one end thereof substantially slotted in the normal direction of belt travel, thereby maintaining traction at the radially outer convex portion only of the belt when it is following a path transversely curved in the plane of the belt, while the portions of the links adjacent the radially inner concave edge of the belt are free to relatively approach each other; at least some opposed pairs of said members having opposed pairs of first connecting means positioned along the sides of said members at a predetermined distance below the tops thereof and intermediate the lengths thereof; a plurality of flight clips each comprising a pair of upstanding legs having at their lower ends a pair of opposed second connecting means corresponding to said first connecting means and engageable therewith by horizontal movement relative thereto, one of said first and second connecting means comprising protrusions and the other of said first and second connecting means defining openings to receive said protrusions, means connecting said legs at spaced apart positions normally to retain said first and second connecting means engaged, each flight clip being resiliently yieldable to permit relative lateral movement of said legs to facilitate engagement and disengagement of said first and second connecting means, and a flange extending a substantial distance outwardly from at least one of said legs along the top of its associated member at a distance above said second connecting means slightly greater than said predetermined distance so as closely to overlie a relatively long portion of the associated wire member to effectively restrict rotation of the clip about said connecting means; said flanges thereby permitting the ends of the wire members of adjacent links to slide thereunder when said adjacent links approach each other to permit the belt to pass around a curve, whereby said clips are easily mountable and removable, are firmly retained in upright position when mounted, and permit substantial curvature of the belt in the plane thereof without interference between said links and said flight clips.

5. A flat wire conveyor belt operable in a path substantially and transversely curved in the plane of the belt which comprises a plurality of continuous transverse tractive links; a plurality of pivotal tractive cross pins; each link being formed to provide a plurality of adjacent tractive wire members extending in the general direction of normal straight belt travel and having cross pin openings in each end of each of said members, all of said members in at least some of said links having the cross pin openings in at least one end thereof substantially slotted in the normal direction of belt travel, thereby maintaining traction at the radially outer convex portion only of the belt when it is following a path transversely curved in the plane of the belt, while the portions of the links adjacent the radially inner concave edge of the belt are free to relatively approach each other; at least some opposed pairs of said members having opposed pairs of openings positioned along the sides thereof at a predetermined distance below the tops thereof and intermediate the lengths thereof; a plurality of upstanding generally U-shaped resilient wire flight clips each having an upper base and a pair of free ended legs depending downwardly from said base, said legs having mounted at the lower ends thereof a pair of opposed horizontal protrusions corresponding to said openings, said resilient flight clips normally retaining said protrusions and openings engaged but being resiliently yieldable to permit relative lateral movement of said legs to facilitate engagement and disengagement of said protrusions and openings, and at least one of said legs having a flange extending a substantial distance outwardly therefrom along the top of its associated member at a distance above said protrusions slightly greater than said predetermined distance so as closely to overlie a relatively long portion of the associated wire member to effectively restrict rotation of the clip about said protrusions; said flanges thereby permitting the ends of the wire members of adjacent links to slide thereunder when said adjacent links aproach each other to permit the belt to pass around a curve, whereby said clips are easily mountable and removable, are firmly retained in upright positions when mounted and permit substantial curvature of the belt in the plane thereof without interference between said links and said flight clips.

References Cited in the file of this patent
UNITED STATES PATENTS

| | | |
|---|---|---|
| 1,435,887 | Anderson | Nov. 14, 1922 |
| 2,192,604 | Painter | Mar. 5, 1940 |
| 2,706,552 | Key | Apr. 19, 1955 |
| 2,796,166 | Rubli | Jan. 18, 1957 |
| 2,872,023 | Bechtel | Feb. 3, 1959 |